No. 675,141. Patented May 28, 1901.
B. J. SCHEUNERT.
ADJUSTABLE HANDLE MEANS FOR COOKING UTENSILS.
(Application filed Jan. 5, 1901.)
(No Model.)
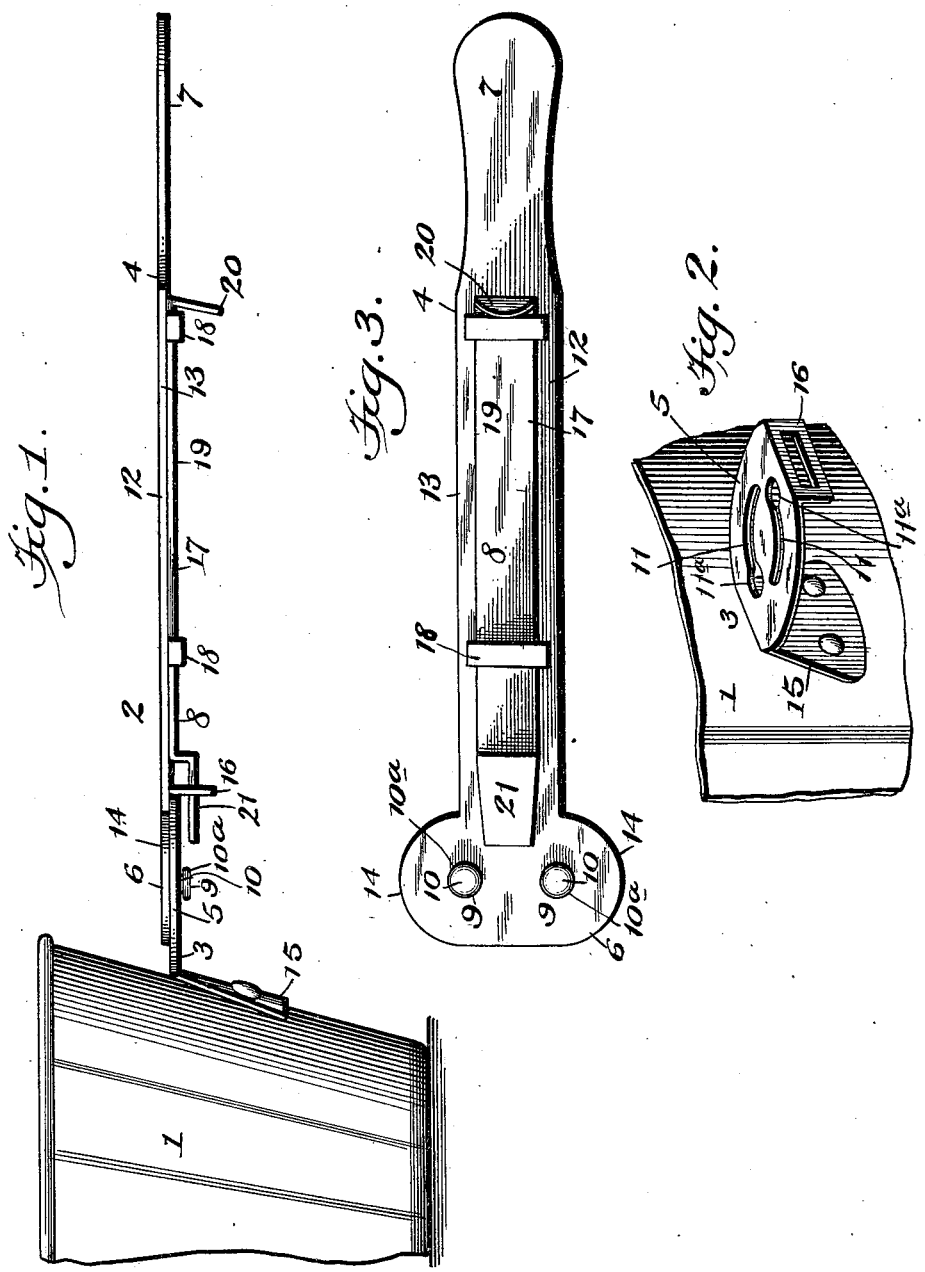
WITNESSES:
INVENTOR
ATTORNEY.

UNITED STATES PATENT OFFICE.

BRUNO JOHANNES SCHEUNERT, OF MIDDLETOWN, NEW YORK.

ADJUSTABLE HANDLE MEANS FOR COOKING UTENSILS.

SPECIFICATION forming part of Letters Patent No. 675,141, dated May 28, 1901.

Application filed January 5, 1901. Serial No. 42,213. (No model.)

*To all whom it may concern:*

Be it known that I, BRUNO JOHANNES SCHEUNERT, a citizen of the United States, residing at Middletown, in the county of Orange and State of New York, have invented certain new and useful Improvements in Adjustable Handle Means for Cooking Utensils, of which the following is a specification.

This invention relates to adjustable handles for cooking utensils; and it has for its object to provide an improved handle construction whereby the main handle portion may be adjusted to any one of a number of utensils and serve in lieu of a separate handle for each utensil.

By means of my improved adjustable handle it is possible to store and arrange a number of cooking utensils in closets and upon stoves and tables without the confusion resulting from the presence of a number of inconveniently-projecting handles. My invention also facilitates easier shipment of utensils in bulk.

In the drawings, Figure 1 is a side view of a cooking utensil provided with my improved adjustable handle. Fig. 2 is a perspective view of a cooking utensil, the handle proper of the adjustable handle having been detached from operative position. Fig. 3 is a bottom plan view of the handle proper.

Corresponding parts in all the figures are denoted by the same reference characters.

Referring to the drawings, 1 designates a cooking utensil which is provided with my improved adjustable handle 2. The handle 2 consists of a permanently-fixed member 3, which is secured to the utensil 1, and a detachable handle proper, 4. The fixed handle member 3 preferably consists of a disk or plate 5, which projects laterally of the utensil to a slight extent, and the handle proper, 4, is provided at one end with a disk or plate 6 and at the other end with a grip portion 7, adapted in formation for the grasp of the hand.

The handle proper, 4, in the preferred form of construction is provided with a locking member 8, which is arranged for coaction with the permanently-fixed handle member 3 to maintain the parts in operative connection. Supplementary locking means 9 are also provided to effect the operative connection of the fixed member 3 and the handle proper, 4, and said supplementary connection means in the preferred form of construction consist of studs or pins 10, provided with enlarged heads $10^a$, which are passed through slots 11, formed in the plate or disk 5.

In the preferred form of construction the handle proper, 4, consists of a single strip or sheet 12, of suitable rigid metal, which is cut or stamped to form a central longitudinal portion 13, the grip portion 7, and the disk or plate 6. The disk or plate 6 preferably embodies laterally-extended portions 14, which serve to present an extended surface portion for engagement with the plate or disk 5. The plate or disk 5 may be integral with the material of which the utensil 1 is formed or may be bolted thereto by an integral extension 15 of the plate or disk 5. The plate or disk 5 is provided at its edge portion opposite that from which the extension 15 projects with an angularly and downwardly projecting transversely-slotted portion 16, which when the parts are connected in operative arrangement receives the locking means 8. The locking means 8 preferably consists of a bolt or slide 17, which is carried beneath the handle proper, 4, and is sustained by keepers or guides 18, which are secured to the plate 12. The bolt or slide 17 in the preferred form of construction consists of a single metallic strip 19, which is suitably cut and stamped or bent to form a thumb-piece 20, which projects with respect to the grip portion 7, and to form a locking-head 21, which projects with respect to the disk or plate 6.

Two of the studs or pins 10 are preferably employed, as well as two of the slots 11, which receive the same. The studs or pins 10 are arranged in spaced relation in a line extending transversely of the disk or head 6, and the slots 11 are concentric and of segmental curved formation, as illustrated, and embody opposite end portions $11^a$, which are of sufficient size to permit the passage of the heads $10^a$ of the pins or studs 10 through the same and are throughout the major portion of their extent of a size which prevents the passage of the heads $10^a$ of the pins or studs 10 through the same.

In connecting the handle proper it is grasped in the hand and the disk or plate 6 is placed upon the disk or plate 5 in position to pass the heads 10ª of the studs 10 through the enlarged end portions 11ª of the curved slots 11. The handle proper is then swung to the left until the studs or pins have traversed the entire length of the slots 11, at which moment the handle proper will project from the utensil in position for the slotted member 16 of the disk or plate 5 to receive the locking-head 21 of the bolt or slide 17, which locking-head is forced through the transverse slot in the member 16 of the disk or plate 5 by advancing the bolt 17 along the handle proper. This movement of the bolt 17 is caused by operating the same by engagement of the thumb with the thumb-piece 20 on the bolt 17. With the parts in this position the locking-head 21 by its engagement with the transversely-slotted member 16 prevents relative pivotal movement of the permanently-fixed member 3 and the handle proper, 4, and the heads 10ª of the studs or pins 10 prevent relative separation of the plate or disk 5 and the plate or disk 6, and consequently of the permanently-fixed member 3 and the handle proper, 4.

The operation and advantages of my improved adjustable handle for utensils will be readily understood. The handle proper, 4, may be readily adjusted to any utensil provided with a permanently-fixed member 3 and may be detached therefrom, as desired. It will be noted that by the use of utensils provided with my improved adjustable handle a number of utensils may be manipulated separately by a single handle, and thus economy of material is effected as well as economy of space in closets and on tables, stoves, shelves, and other similar places. A further advantage arises from the fact that when a utensil is placed upon a stove the handle may be detached from the same, and thus prevented from becoming so overheated as to prevent directly grasping the same with the hand. When it is desired to remove the utensil, the handle may be readily connected with the same, and although the temperature of the utensil may be high the handle will be cool and will enable convenient and comfortable manipulation of the utensil. It will be further noted that the operation of attaching the handle proper to the utensil as well as the operation of detaching the handle from the latter are performed by simple manipulation of the parts comprising simply a turn of the handle proper with relation to the utensil, with the studs or pins 10 projecting through the slots 11, and an adjustment of the bolt 17 longitudinally of the handle proper. The integral construction of the permanently-fixed member 3 and the integral construction of the major portion of the handle proper, 4, enable inexpensive manufacture of the improved handle, and the entire device is of simple construction and few parts and not likely to get out of repair.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. The herein-described improved adjustable handle for utensils, comprising a disk or plate adapted for permanent connection with the utensil, a handle proper embodying a disk or plate adapted for connection with said first-named disk or plate, said disks or plates being provided one with two concentric segmental slots and the other with two studs or pins provided with enlarged heads, said segmental slots being formed at one end to receive the enlarged heads of said studs or pins and being, in the major portion, of dimensions to prevent the passage of the heads of said studs or pins through the same whereby relative separation of said disks or plates may be prevented, and means carried by said handle proper for locking the same in operative position with respect to the utensil.

2. The herein-described improved adjustable handle for utensils, comprising a member adapted for permanent connection with the utensil and embodying a disk or plate provided with concentric segmental slots having opposite enlarged end portions and provided with a transversely-slotted angularly-projected extension, and the handle proper embodying a disk or plate provided with projecting headed pins or studs arranged for insertion through said segmental slots, said handle proper being provided with a locking-bolt capable of adjustment longitudinally of the handle proper and provided with a locking-head arranged for engagement with said transversely-slotted extension of said first-named member.

In testimony whereof I have signed my name in the presence of two subscribing witnesses.

BRUNO JOHANNES SCHEUNERT.

Witnesses:
MORRIS B. WOLF,
J. NOBLE WOOD.